United States Patent [19]

Turner

[11] Patent Number: 4,498,763
[45] Date of Patent: Feb. 12, 1985

[54] FIXED FOCUS ENLARGER

[75] Inventor: George F. A. M. Turner, Ingatestone, England

[73] Assignee: Ciba-Geigy A.G., Basel, Switzerland

[21] Appl. No.: 508,291

[22] Filed: Jun. 27, 1983

[51] Int. Cl.³ .............................................. G03B 27/52
[52] U.S. Cl. ......................................... 355/55; 355/71
[58] Field of Search .................. 355/55, 39, 71, 74, 355/18, 21, 27, 45; 353/75-77, 101; 354/187

[56] References Cited

U.S. PATENT DOCUMENTS

| 1,808,274 | 6/1931 | Webster | 355/71 |
| 2,315,452 | 3/1943 | Pifer | 355/71 |
| 4,220,410 | 9/1980 | Bloodgood | 355/18 |

FOREIGN PATENT DOCUMENTS

| 86227 | of 1895 | Fed. Rep. of Germany . |
| 586131 | of 1933 | Fed. Rep. of Germany . |
| 824597 | of 1951 | Fed. Rep. of Germany . |
| 2847187 | of 1979 | Fed. Rep. of Germany . |
| 381258 | of 1908 | France . |
| 453536 | of 1913 | France . |

*Primary Examiner*—L. T. Hix
*Assistant Examiner*—Della J. Rutledge
*Attorney, Agent, or Firm*—Harry Falber

[57] ABSTRACT

A fixed focus enlarger having a frame which encloses an image focussing area which comprises located on the frame a removable transparency holder having a transparency aperture and an enlarging lens located at a predetermined distance beneath the transparency aperture, the enlarger being characterized in that there is also provided an extension tube which is insertable between the top of the said frame and the said removable transparency holder and which when in position in the enlarger increases the distance between the image focussing area and the enlarging lens by a predetermined amount, there also being provided means either to decrease the focal length of the enlarging lens by a predetermined amount, or means to decrease the distance between the enlarging lens and the transparency frame by a predetermined amount, so that in either case when the extension tube is in position in the enlarger a predetermined area of part of a transparency can be focussed on the focussing area to form an image of that part of the transparency which is the same size as that formed of the whole transparency in the absence of the extension tube.

In one embodiment a negative lens is used to increase the focal length of the enlarging lens.

In another embodiment the enlarging lens is held in a panel the position of which in relation to the transparency aperture can be altered.

8 Claims, 8 Drawing Figures

FIXED FOCUS ENLARGER

This invention relates to photographic enlargers of the fixed focus type.

Photographic enlargers are a comparatively expensive item for a person wishing to start printing their own negatives or for schools when a number of enlargers are required for practical use by a class. One of the more expensive parts to manufacture in a conventional enlarger is the mechanism required to adjust the focus of the enlarging lens to enable different enlargements of an area of the negative to be printed. However for a person starting out in photography or for a school it is perhaps more important to provide a cheap enlarger by use of which standard enlargements from a standard negative can be produced than a much more expensive enlarger whose capabilities are much greater but which are unlikely to be exploited. Thus a number of fixed focus enlargers have been introduced on to the market to supply the demand for such inexpensive enlargers. Usually these enlargers consist of a frame or box-like structure which encloses the image-framing area. Mounted on the frame are a transparency holder having the enlarging lens beneath it and mounted on the transparency holder is the lamphouse. In such a construction the distance of the lens to the image framing area is fixed. The optical characteristics of the lens is often so chosen that when a standard 35 mm transparency (negative) is present in the transparency holder the size of the projected image framing area is en-print size that is to say 8.5 cm by 12.7 cm. However the need has arisen to increase the capabilities of such simple enlargers without materially increasing their cost.

Therefore according to the present invention there is provided a fixed focus enlarger having a frame which encloses an image focussing area which comprises located on the frame a removable transparency holder having a transparency aperture and an enlarging lens located at a predetermined distance beneath the transparency aperture, the enlarger being characterised in that there is also provided an extension tube which is insertable between the top of the said frame and the said removable transparency holder and which when in position in the enlarger increases the distance between the image focussing area and the enlarging lens by a predetermined amount, there also being provided means either to increase the focal length of the enlarging lens by a predetermined amount, or means to decrease the distance between the enlarging lens and the transparency frame by a predetermined amount, so that in either case when the extension tube is in position in the enlarger a predetermined area of part of a transparency can be focussed on the focussing area to form an image of that part of the transparency which is the same size as that formed of the whole transparency in the absence of the extension tube.

In the enlarger of the present invention as in all other enlargers the size of the projected image on the focussing area depends on the equation:

$$v = (u \times F)/u - F$$

where u is the distance between the transparency and the enlarging lens, v is the distance between the enlarging lens and the image focussing area and F is the focal length of the enlarging lens.

In the enlarger of the present invention the distance u, the distance between the enlarging lens and the transparency, is so chosen that in the preset position of the enlarging lens a transparency of a predetermined size will provide a projected image which just fills a framed focussing area. Usually the size of the transparency is 35 mm, and the size of the projected image is 8.5 cm × 12.7 cm (4 diameters enlargement).

Thus in all the embodiments of the enlarger of the present invention the object of placing the extension tube in the enlarger is to obtain an enlargement of a part of a transparency. This is achieved by increasing v the distance between the enlarging lens and the image focussing area accompanied by either a decrease in u the distance between the enlarging lens and the transparency aperture or by an increase in the focal length of F of the enlarging lens as dictated by the equation set forth above.

The accompanying drawings will serve to illustrate the invention.

In FIGS. 1 to 5 the same numbers have the same meaning.

Figure 6:
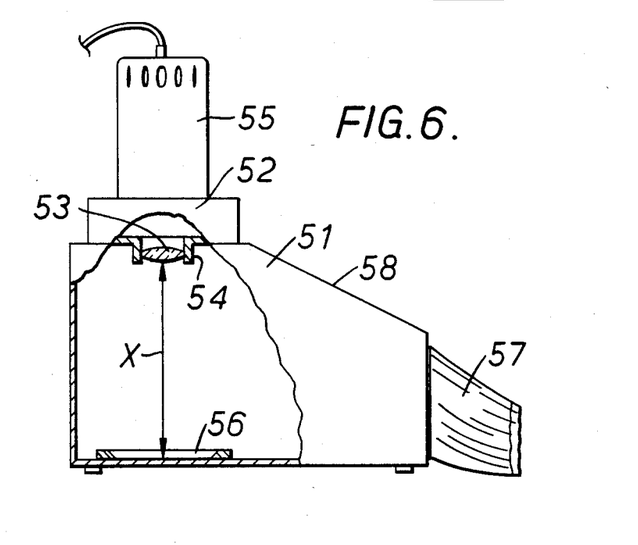
FIG. 6 is a part sectional side elevation of another fixed focus enlarger.
Figures 7, 8:
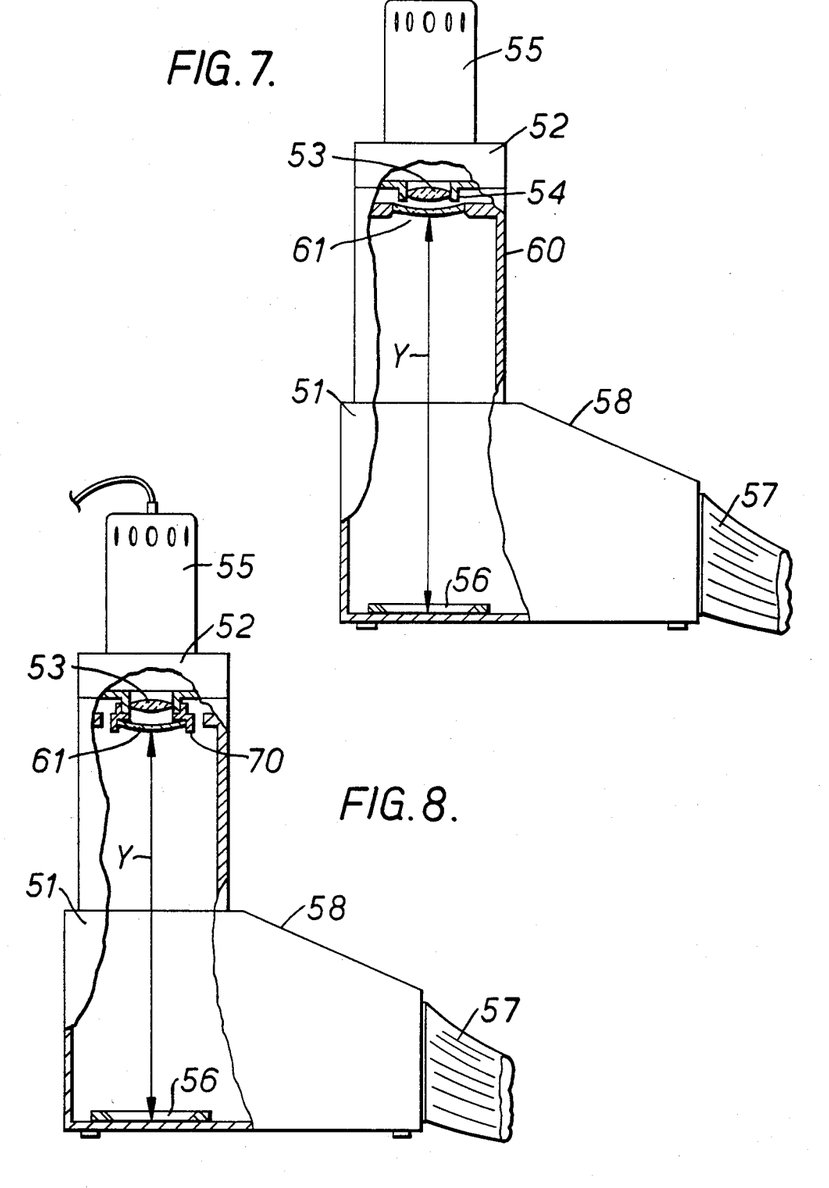
FIG. 7 is a part sectional side elevation of the fixed focus enlarger of FIG. 4 with an extension tube holding a negative lens in position in the enlarger.
FIG. 8 is a part sectional side elevation of a similar enlarger with an extension tube similar to that shown in FIG. 6 but with the negative lens in a fitment means which fits over the enlarging lens holder.

In FIGS. 6 to 8 the same numbers have the same meaning.

Figure 1:
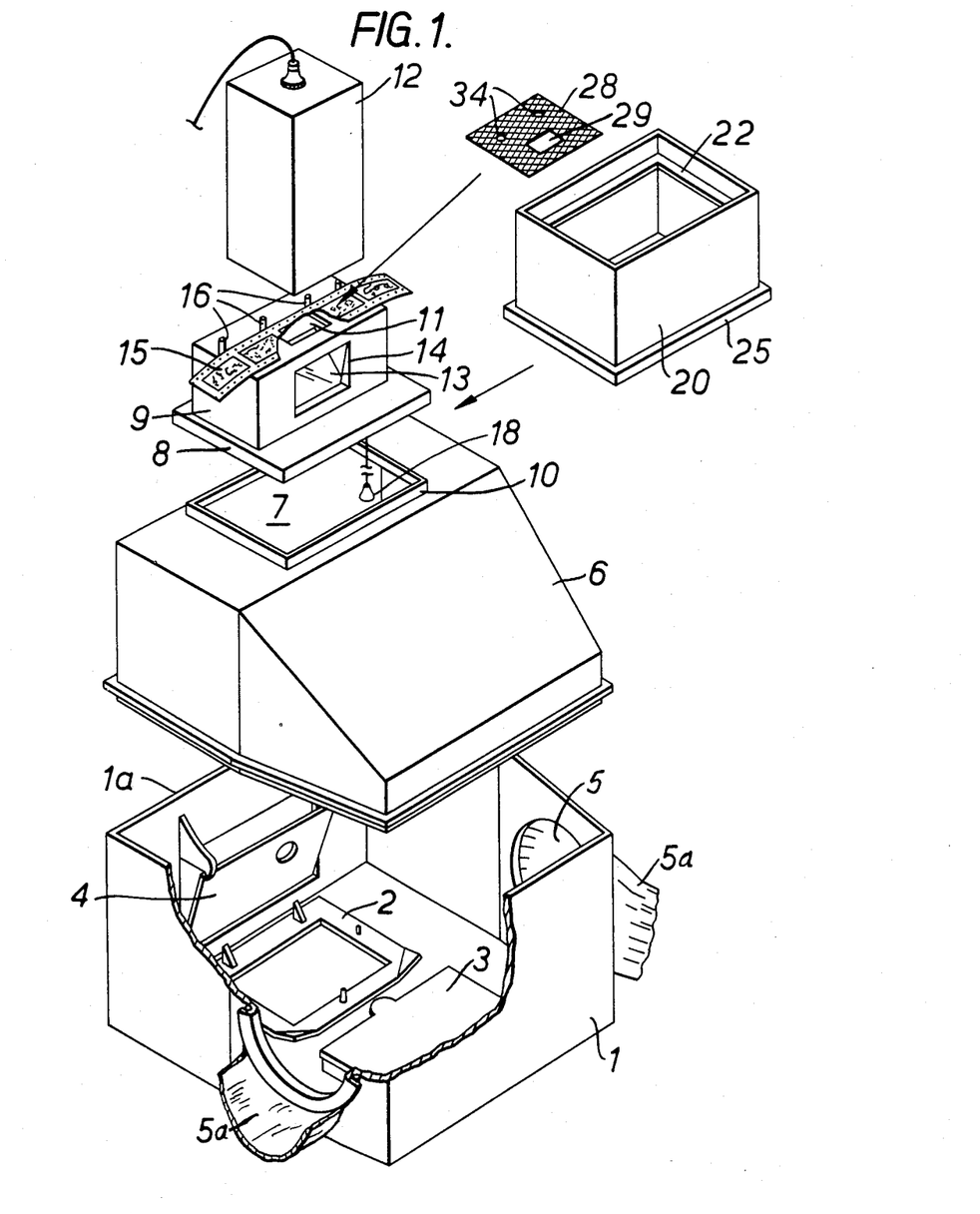
FIG. 1 is an exploded perspective view of an enlarger according to the present invention.

In FIG. 1 the enlarger comprises a light opaque lower box 1 which has mounted on the floor a liftable frame 2 and a paper safe 3.

Mounted in an aperture 5 on the two side walls are two knickered arm holes 5a. Mounted on the back wall 1a is an aperture means 4 connected to an external processing dish (not shown) through which exposed print material can be passed to the processing dish in a light-tight manner.

Shown above the lower box 1 is an upper box lid 6 which is composed of red-dyed polystyrene. Lid 6 fits on to box 1 in a light-tight manner. Lower box 1 and lid 6 constitute the frame of the enlarger.

Present on the top lid 6 is an aperture 7 over which a flange 8 attached to a removable transparency holder 9 fits.

Present on the top of the transparency holder 9 is a transparency aperture 11 through which light from the removable lamp holder 12 is directed. Present below the light aperture 11 is an inclined mirror 13 (shown in the inclined position) in an aperture 14. On top of the transparency aperture 11 there is shown a strip of 35 mm negative film 15 (in fragmentary form to show the light aperture 11 beneath it).

Behind the strip of film 15 is a row of film edge locating pins 16.

Figure 2:
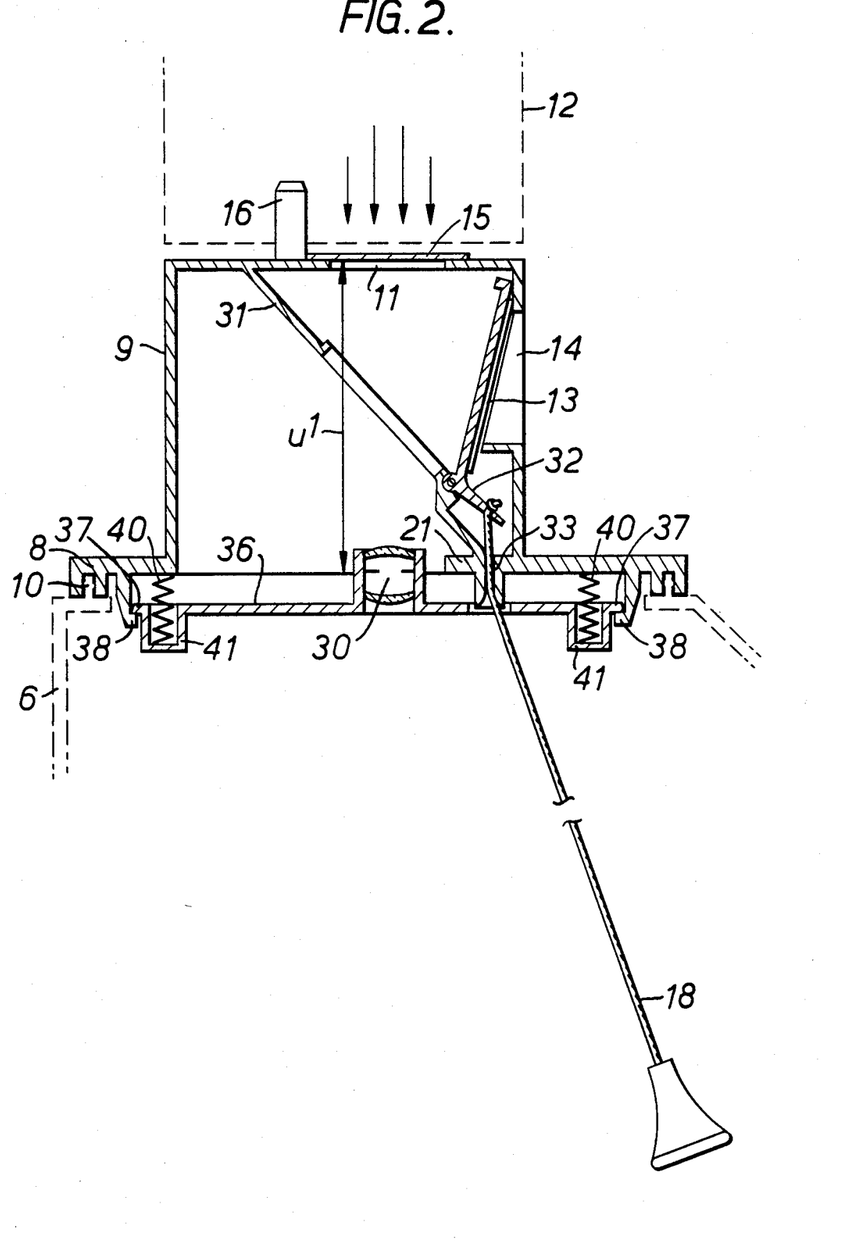
FIG. 2 is a sectional side elevation of part of the enlarger of FIG. 1 showing a focussing mirror in the open position.
Figure 3:
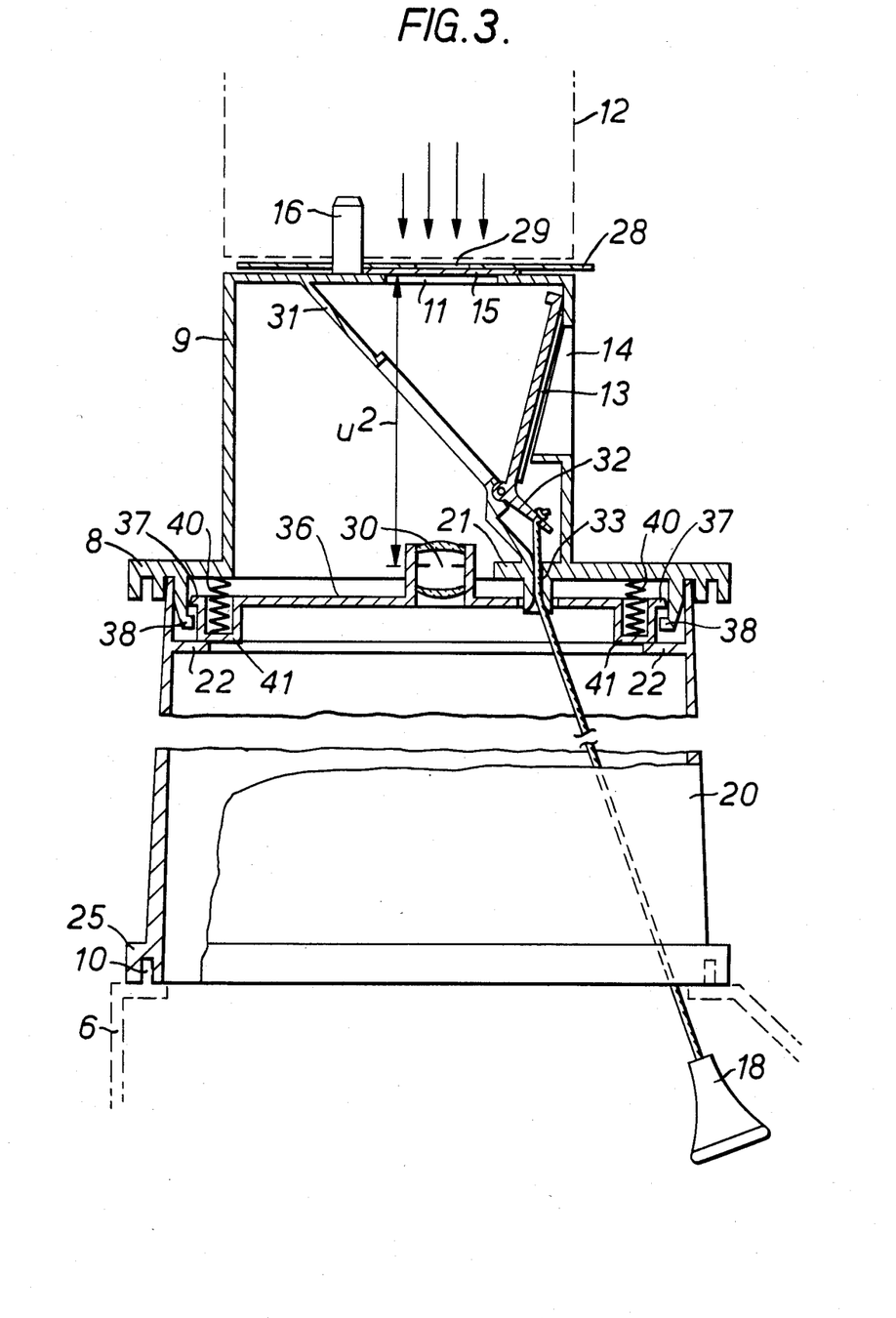
FIG. 3 is the same view as FIG. 2 but with an extension tube fitted and the mirror in the open position.

Suspended from the transparency holder 9 is a draw cord 18 which acts to move the mirror 13 out of the path of the light (as shown in FIGS. 2 and 3).

Shown to one side of the enlarger is an extension tube 20 which has stamped on it the increased exposure time required when an extension tube is used. This extension tube 20 has an internal flange 22.

Flange 8 of holder 9 its over flange 10 on top of lid 6 (as shown in FIG. 2).

Flange 25 on extension tube 20 fits over flange 10 on lid 6 (as shown in FIG. 3) and flange 8 on holder 9 fits over the top of the extension tube 20 (as shown in FIG. 3).

Also shown to one side of the enlarger is a mask 28 composed of a pigmented plastics film material which is light translucent. Present in the middle of the mask 28 is a clear rectangular area 29 which is the area to be enlarged when using the extension tube 20. Above the clear rectangular area 29 are two holes 34 through which locating pins 16 on the holder 9 fit.

There is shown in FIGS. 2 and 3 an enlarging lens 30 which is held in a movable panel 36 in the floor of the holder 9. The ends 37 of panel 36 rest on abutment members 38 attached to the holder 9. Panel 36 is biassed towards its lowest position by springs 40 located in recesses 41.

A support frame 31 supports the inclined mirror 13 in the open position.

The draw cord 18 is shown attached to a spring-loaded pivoting member 32. The string of the draw cord 18 passes through aperture 33 in the half floor 21 of the holder 9 (in FIGS. 2 and 3).

The draw cord 18 has been pulled down. This has caused the mirror 13 to move out of the way of the light from the lamphouse 12. Thus this light now passes through the lens 30 to form an enlarged image of the transparency on the area surrounded by the frame 2.

In FIG. 3 the extension tube 20 has been fitted on the enlarger between lid 6 and holder 9. The mask 28 is fitted over the pins 16 so that light from the lamphouse passes therethrough before reaching the transparency 15.

When extension tube 20 is fitted the internal flange 22 therein forces up panel 36 so that the ends 37 of the panel 36 no longer rest on the abutment members 38. Thus distance $u^1$, the distance between the lens 30 and the aperture 15, has been shortened to $u^2$. Further the distance of v the distance between the lens 30 and the area surrounding frame 2 has been lengthened by the insertion of the extension tube 20 between the top of the box lid 6 and the holder 9. (V is not shown in either FIG. 2 or 3).

In this figure the draw cord 18 is also shown in the pulled position so that the mirror 13 is not in the inclined position and light from the lamphouse passes through the mask 28 and the transparency 15 and then through lens 30 whereby it is focussed on to the area surrounded by frame 2 on the bottom of the enlarger. In this case the image focussed on the framing area is an enlarged view of that part of the transparency below the clear rectangular area 29 of the mark 28.

If the mirror 13 in FIG. 3 were in the inclined position (as in FIG. 1) then the operator would see a clear view in the middle of the mirror 13 of that part of the transparency over which the clear rectangular area 29 rests. This is the area projected on to the framing area in FIG. 3. Thus the area of transparency to be further enlarged can be adjusted by the operator when the lamp is on and the mirror 13 is in the inclined position.

As in FIGS. 2 and 3 preferably the enlarging lens is mounted in a movable panel 36, most preferably this panel is spring biased by springs 40 to return to its lower position when the extension tube 20 is removed from the enlarger.

Extension tubes 20 of different lengths may be provided to achieve different size enlargements. These extension tubes would be fitted with internal flanges 22 so located in the extension tube to raise the enlarging lens 36 to achieve the required distance $u^2$.

In one embodiment of the invention an enlarger as shown in FIGS. 1 to 3 was designed to take 35 mm negatives in the transparency holder and to project the whole picture area of this negative (3.0 cm×2.0 cm) on to an area 12 cm×8 cm (en print size) in area surrounded by frame 2. This required that the distance between lens 30 and frame 2 was 25 cms($v^1$). The focal length F of the lens used has 5 cm.

The extension tube 20 was designed to enable an area 1.5 cm long×1 cm wide of the negative to be projected on to the frame 2 ($v^2$) to produce an identical size enprint (i.e. 12 cm×8 cm). This required that distance between lens and frame 2 was lengthened to 45 cm and that $u^1$ which in FIG. 2 was 6.25 cm was shortened to $u^2$ which was 5.62 cm. The time of exposure required when extension tube 20 was used to produce the same density print using the same negative compared with exposure time required when no extension tube was used was found to be longer.

The enlarger shown in FIGS. 1 to 3 can be used in full daylight. In operation there is present in safe 3 a stack of print material and there is attached externally to aperture 4 a light-tight processing dish so that a sheet of exposed print material may be passed via aperture 4 to the processing dish. A strip of 35 mm film 15 is placed in the holder 9 and the lamp in lamphouse 12 is switched on. A real image of the transparency is seen by the operator reflected from the inclined mirror 13. When the operator has aligned correctly the transparency he then places in frame 2 a sheet of print material from safe 3 using the arm holes 5a. Then still with his arms in the arm holes 5a he pulls draw cord 18 for the period of time he considers is the correct exposure time. He then releases cord 18 and slips the exposed print via slot 4 into light-tight processing dish. The print material is then processed and as is often the case one or two further exposures may be required to produce a correctly exposed processed print. If that transparency contained any picture area of which further enlargement is desired, then the lamphouse 12 and holder 9 are removed from lid 6 and extension tube 20 is placed on lid 6, the holder 9 is placed on the extension tube 20.

The mask 28 is then placed over transparency 15 and is retained by the pins 16 going through holes 34. The lamphouse 12 is then placed on the holder 9. The lamp is then switched on and the transparency 15 is moved under the mask 28 until the desired area to be enlarged is in position under the clear rectangular area 29 in the mask 28. This can be seen by the operator viewing the image reflected by the inclined mirror 13. A fresh sheet of print material from safe 3 is placed in frame 2. The operator then pulls draw cord 18 for X times as long as the time required for the correct exposure when extension tube 20 is not in position on the enlarger. The exposed print is slipped into the processing dish via the apperture 4 and processed to yield a print showing the selected area of the transparency enlarged eight diameters compared with the original transparency.

As just noted when an extension tube is used with the enlarger a greater exposure time to expose any given transparency to provide a print of the given density is required than when the same transparency is being printed without the extension tube. For example if the linear length of the area of the transparency being printed with a particular extension in position is half of the length of the linear area of the whole transparency which is printed when no extension tube is used then the exposure time required is four times that required in the absence of the extension tube. Thus preferably the increased exposure time required when using any given extension tube is noted clearly on the extension tube.

In the embodiment of the invention shown in FIGS. 1 to 3 the enlarger is of the enclosed image framing area type which can be used in daylight. Thus the whole of the frame-structure which surrounds the image-framing area is constituted by a box which has as its lower section light opaque walls and which has as its upper section which are opaque to that part of the visible spectrum to which the photosensitive material to be exposed therein is sensitive. Alternatively the frame could be draped with light-opaque material to form a tent-like structure. If at least a portion of the frame is covered with a material which is partially light transparent but opaque to light to which the photosensitive material is sensitive then it is possible to see the projected image in the image framing area through this portion. A closable window in the frame through which to view the image may be provided. In such an enlarger light-tight arm holes are provided to enable an operator to place photosensitive material in the image framing area and remove it after exposure to a processing dish or other container present within the confines of the enclosed image-framing area.

However it is difficult to see the projected image in some enclosed frame enlargers and preferably in the enlarger of the present invention there is provided in the transparency holder a movable inclined mirror which in a first position when the lamphouse is operating with a transparency in the holder reflects an illuminated erect image of the transparency away from the enlarger so that it can be viewed by an operator of the enlarger, but which in a second position is moved from beneath the transparency so allowing the illuminated image of the transparency to fall on the image framing area. This is shown in FIGS. 1 to 3.

Even in daylight a bright clear erect image of the transparency can be seen in the inclined mirror. This image is exactly the same image as is projected down on to the image framing area in the absence of the mirror in the path of the light. Thus the position of the transparency in the holder can be adjusted correctly.

As shown in FIG. 1 there may be a projected area mask 28 which can be laid on the transparency in the holder. This mask delineates the area which will be enlarged in the image framing area using a particular extension tube. Preferably this mask has a completely transparent area in the middle which is the area to be enlarged and an opaque or semi-transparent outer margin which covers that area of the transparency which will not be enlarged.

Figure 4:
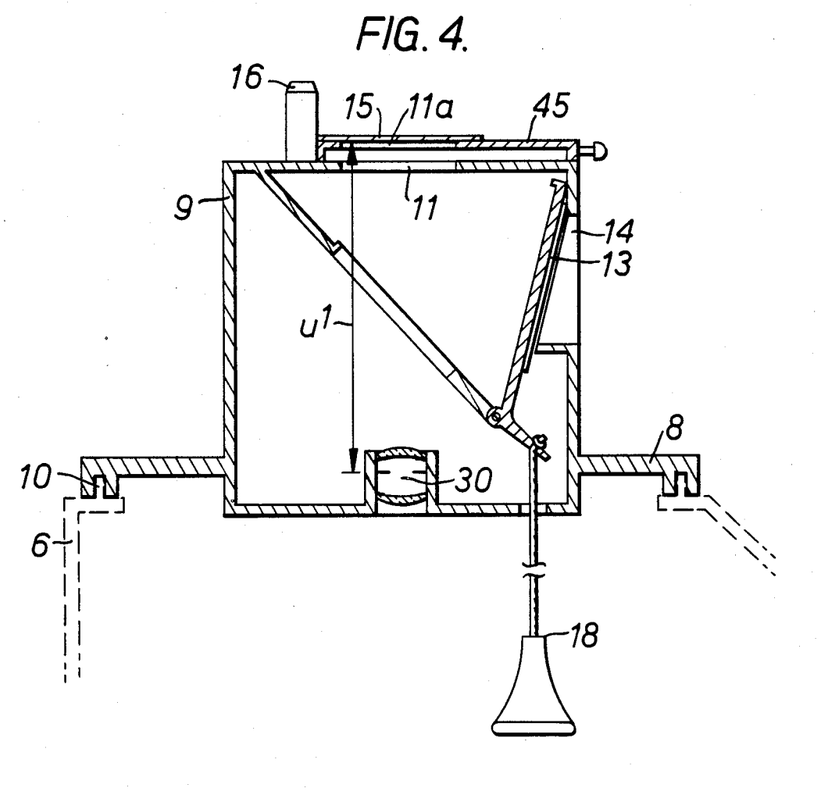
FIGS. 4 and 5 are modifications to the enlarger shown in FIGS. 2 and 3.
Figure 5:
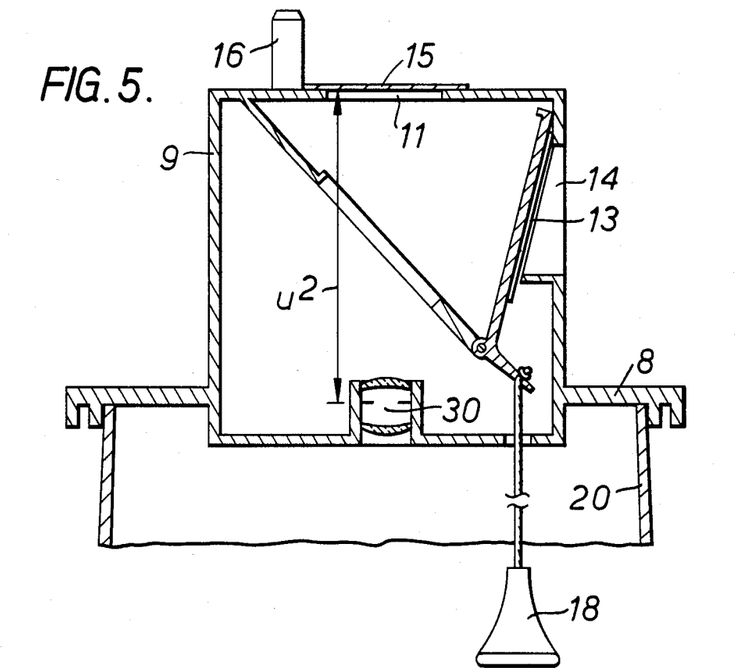

In the embodiment of the enlarger shown in FIGS. 4 and 5 the transparency holder 9 also comprises a moveable mirror 13. However in this case when the extension tube 20 is not in position as shown in FIG. 4 the transparency 15 rests on a raised but removable transparency carrier 45 having an aperture 11a therein. When the extension tube 20 is placed in position as shown in FIG. 5 the raised transparency carrier 45 is removed. Thus u is decreased by the requisite amount by the removal of the raised transparency carrier 45. The transparency then rests over the transparency holder aperture 11. The method of operating the enlarger of FIGS. 4 and 5 is as described with reference to FIGS. 1 to 3.

There is shown in FIGS. 6 to 8 an enlarger wherein the projected image is viewed through a red-dyed inclined side panel.

In FIGS. 6 to 8 a fixed focus enlarger comprises a box 51 composed of dark red-dyed polystyrene. Removably located on box 51 is a transparency holder 52 which has fixed below it an enlarging lens 53 in a lens holder 54 which has fixed below it an enlarging lens 53 in a lens holder 54. On top of the transparency holder 52 is a lamphouse 55.

At the bottom of the box 51 is an image framing means 56. Located in one side wall of the box 51 is a pair of knickered arm-holes 57 (only one of which is visible).

Part of the side wall 58 of the box is inclined to allow an image focussed on the frame 56 to be visible to an operator outside the enlarger.

Present in FIG. 7 is an extension tube 60 which fits into the same groove on the top of the box 51 as the transparency holder 52 in FIG. 6. resting on the extension tube 60 is the tansparency holder 52. Mounted in the extension tube 60 is a negative lens 61 which is located within 1 cm of the enlarging lens 53.

The distance between enlarging lens 53 and frame 56 in FIG. 6 is labelled X and the distance between negative lens 61 and frame 56 in FIG. 7 is labelled Y.

In one embodiment of the invention an enlarger as shown in FIGS. 6 and 7 was designed to take 35 mm negatives in the transparency holder and to project the whole picture area of this negative (3.0 cm×2.0 cm) on to an area 12 cm×8 cm (en print size) in the image framing means 56. This required that X was 25 cms. The focal length F of the enlarging lens was 5 cm. The distance u between the enlarging lens and the transparency was 6.25 cm.

An extension tube was designed to enable an area 1.5 cm long×1 cm wide of the negative to be projected on to the frame 56 to produce an identical size print (i.e. 12 cm×8 cm). This required that distance Y was 50 cm and that a −2.0 dioptre negative lens 61 was used. The distance u remains the same. The time of exposure required when extension tube 60 was used to produce the same density print using the same negative compared with the exposure time required when no extension tube was used was found to be four times as long. Therefore there was placed on extension tube 60 the words 'Exp.×4'.

In operation there is present in box 51 both in FIGS. 6 and 7 (but not shown) a light-tight envelope containing photosensitive paper 12.5 cm×8.5 cm in size and light-tight means to contain the exposed paper so that it can be processed away from the enlarger.

Thus to use the enlarger of FIGS. 6 and 7 a packet of print material is placed in the box 51 and the transparency holder 52 is placed directly on box 51, with the lamphouse 55 on the holder 52. A photographic 35 mm negative or (more usually) a length of exposed 35 mm film is placed in the holder 52 and the lamp switched on to focus the image on to frame 56. The correct positioning of the negative can be observed through panel 58.

When the positioning is correct the lamp is switched off and a sheet of print material placed in the frame 56 by the operator using the arm holes 57. An exposure of the print is then carried out and the exposed print material placed in a light-tight container. The print material is then developed and as is often the case one or two exposures may be required to obtain a print which has been exposed for the correct period of time. If that transparency contained any picture area of which further enlargement is desired, then the lamphouse 55 and transparency holder 52 are removed from the box 51 and the extension tube 60 is placed thereon so that negative lens 61 is in close proximity to the enlarging lens 53. The transparency holder 52 is then placed on the extension tube 60 and the lamphouse on it in turn. The lamp is turned on and the transparency moved under the lamp so that the required area is focussed on frame 56. This is observable through panel 58. The lamp is switched off and a fresh sheet of print material placed in the frame 56. The print is then exposed for four times as long as the exposure time required to produce a correctly exposed print from the same transparency when the extension tube 60 was not used.

The exposed print is then developed to yield a print showing an area of the transparency enlarged eight diameters.

It is possible to provide a number of different length extension tubes with different negative lens therein to provide for different sizes of enlargment. A separate masking frame for each extension tube is required if a masking frame is used.

However in order to ensure that the negative lens is located as close as possible to the enlarging lens it can be preferable to provide a removable negative lens which can be fitted below the enlarging lens in the tansparency holder.

In FIG. 8 the enlarger is as shown in FIG. 7, except that the negative lens 61 is located in a detachable lens holder 70 which fits over the enlarging lens 53 and is not present in the extension tube 60.

The method of operation of the enlarger of FIG. 8 is as described with reference to FIG. 7.

I claim:

1. A fixed focus enlarger having a frame which encloses an image focussing area which comprises located on the frame a removable transparency holder having a transparency aperture and an enlarging lens located at a predetermined distance beneath the transparency aperture, the enlarger being characterised in that there is also provided an extension tube which is insertable between the top of the said frame and the said removable transparency holder and which when in position in the enlarger increases the distance between the image focussing area and the enlarging lens by a predetermined amount, there also being provided means either to increase the focal length of the enlarging lens by a predetermined amount, or means to decrease the distance between the enlarging lens and the transparency aperture by a predetermined amount, so that in either case when the extension tube is in position in the enlarger a predetermined area of part of a transparency can be focussed on the focussing area to form an image of that part of the transparency which is the same size as that formed of the whole transparency in the absence of the extension tube.

2. A fixed focus enlarger according to claim 1 characterised in that the enlarging lens is held in the transparency holder in a panel which is movable in a vertical direction but which is biassed towards its lowest position and wherein the extension tube is so constructed that when in position in the enlarger it raises the panel holding the enlarging lens thus decreasing the distance between the enlarging lens and the transparency aperture by a predetermined amount.

3. A photographic enlarger according to claim 2 characterised in that panel which holds the image focussing lens is spring biassed towards its lowest position.

4. A photographic enlarger according to claim 2 which is characterised in that it is provided with a number of different length extension tubes which raise the panel holding the lens to different heights to provide for different sizes of enlargement.

5. A fixed focus enlarger according to claim 1 characterised in that there is provided a removable raised transparency carrier which is used when the extension tube is not in position in the enlarger but which is removed to decrease the distance between the enlarging lens and the actual transparency aperture by a predetermined amount when the extension tube is in position in the enlarger.

6. A fixed focus enlarger according to claim 5 characterised in that it is provided with a number of different length extension tubes and a like number of matched raised transparency carriers to provide for different size enlargements.

7. A fixed focus enlarger according to claim 1 characterised in that the focal length of the enlarging lens is altered by placing a negative lens of predetermined focal length close to the enlarging lens when the extension tube is in position.

8. A fixed focus enlarger according to claim 7 characterised in that there is provided a number of different length extension tubes and a like number of matching negative lenses to provide for different enlargements.

* * * * *